US012707115B2

(12) United States Patent
Li et al.

(10) Patent No.: US 12,707,115 B2
(45) Date of Patent: Aug. 11, 2026

(54) SERVER, METHOD AND COMPUTER PROGRAM

(71) Applicant: 17LIVE Japan INC., Tokyo (JP)

(72) Inventors: Kun-Ze Li, Taipei City (TW); Che-Wei Liu, Taipei City (TW); You-Chang Lin, Taipei City (TW); Chieh-Min Chen, Taipei City (TW); Hao-Chia Chung, Taipei City (TW); Yu-Cheng Fan, Taipei City (TW); Chia-Yi Yeh, Taipei City (TW); Yu-Chuan Chang, Taipei City (TW); Chi-Hao Hsieh, Taipei City (TW); Yung-Chi Hsu, Taipei City (TW); Po-Kao Tseng, Taipei City (TW); Chien-Ming Lai, Taipei City (TW); Shih-Wei Chou, Taipei City (TW)

(73) Assignee: 17LIVE Japan INC., Tokyo (JP)

( * ) Notice: Subject to any disclaimer, the term of this patent is extended or adjusted under 35 U.S.C. 154(b) by 39 days.

(21) Appl. No.: 19/011,530

(22) Filed: Jan. 6, 2025

(65) Prior Publication Data

US 2025/0227325 A1 Jul. 10, 2025

(30) Foreign Application Priority Data

Jan. 9, 2024 (JP) ................................ 2024-001428

(51) Int. Cl.
*H04N 21/433* (2011.01)
*G06F 9/455* (2018.01)
(Continued)

(52) U.S. Cl.
CPC ......... *H04N 21/4334* (2013.01); *G06F 9/455* (2013.01); *H04N 21/2187* (2013.01); *H04N 21/478* (2013.01)

(58) Field of Classification Search
CPC ........... H04N 21/4334; H04N 21/2187; H04N 21/478; G06F 9/455
See application file for complete search history.

(56) References Cited

U.S. PATENT DOCUMENTS

2012/0245918 A1* 9/2012 Overon .................. G06F 9/455
2016/0266915 A1* 9/2016 Morelli .................. G06F 9/455
2021/0152692 A1* 5/2021 Valusamy .............. H04L 67/34

FOREIGN PATENT DOCUMENTS

JP 2008512734 A 4/2008
JP 2013110707 A 6/2013
(Continued)

OTHER PUBLICATIONS

Notice of Allowance dated Jun. 25, 2024 of the corresponding Japan patent application No. 2024-001428.
(Continued)

*Primary Examiner* — Anthony Bantamoi
(74) *Attorney, Agent, or Firm* — HDLS IPR SERVICES; Chun-Ming Shih

(57) ABSTRACT

A server comprising a circuitry, wherein the circuitry is configured to perform: generating an emulator in response to a request from a first user terminal of a first user; launching an application via the emulator; receiving streaming data and interaction data via the application; rendering the streaming data with the interaction data; recording the rendered streaming data and interaction data as a clip; and storing the clip for access from the first user terminal of the first user. According to the present disclosure, the clips may be generated in a more efficient and accurate manner, and a more immersive experience on watching the clips may be provided. Moreover, the review and share of clips may be more flexible. Therefore, the user experience may be improved.

10 Claims, 10 Drawing Sheets

(51) Int. Cl.
*H04N 21/2187* (2011.01)
*H04N 21/478* (2011.01)

(56) References Cited

FOREIGN PATENT DOCUMENTS

| | | | |
|---|---|---|---|
| JP | 2016177696 | A | 10/2016 |
| WO | 2008117473 | A1 | 7/2010 |
| WO | 2022146709 | A1 | 7/2022 |

OTHER PUBLICATIONS

"How to Create, Edit, and Share Clips", https://help.twitch.tv/s/article/how-to-use-clips?language=en_US.

* cited by examiner

320

| Stream ID | livestreamer ID | Viewer ID |
|---|---|---|
| ST22 | 001A | SS5, SS12, SS43 |
| ST92 | 002B | TT3, TS2 |
| ... | ... | ... |

| User ID | Point | Level | Status |
|---|---|---|---|
| 001A | 3243 | 10 | normal |
| SS5K | 1803 | 35 | VIP |
| 003C | 9201 | 90 | SVIP |
| ... | ... | ... | ... |

| Archive ID | Timestamp | Duration | Archive URL |
|---|---|---|---|
| ts001 | 2022-08-05T06:00:00Z | 1 | http://ts.001 |
| ... | ... | ... | ... |
| ts251 | 2022-08-05T06:25:32Z | 1 | http://ts.251 |
| ... | ... | ... | ... |

| Context ID | Type | Timestamp |
|---|---|---|
| CTT22 | comment | 2022-08-05T06:25:32Z |
| ... | ... | ... |
| CTT73 | gift | 2022-08-05T06:55:22Z |
| ... | ... | ... |

| Clip ID | Duration | URL |
|---|---|---|
| CP17 | 90s | http://cp.017 |
| ... | | |
| CP25 | 60s | http://cp.025 |
| ... | ... | ... |

FIG. 8

SERVER, METHOD AND COMPUTER PROGRAM

CROSS-REFERENCE TO RELATED APPLICATIONS

This application is based on and claims the benefit of priority from Japanese Patent Application Serial No. 2024-001428 (filed on Jan. 9, 2024), the contents of which are hereby incorporated by reference in their entirety.

BACKGROUND OF THE DISCLOSURE

Technical Field

This disclosure relates to information and communication technology, and in particular, to a server, method and computer program in a live streaming.

Description of the Related Art

Some APPs or platforms provide live streaming service for livestreamers and viewers to interact with each other. The livestreamers may have a performance to cheer up the viewer and the viewer may send gifts to support the livestreamers.

The viewers may clip the highlighted portion for review afterward. Clips also allow the users to capture and share the most unique moments from broadcasts. Non-Patent Document 1 discloses a method for clip creating, editing, and sharing from broadcasts.

However, the current archive service still needs more improvements in order to provide a more immersive experience on watching the clips. Therefore, a more efficient and accurate archive service is on demand. [Non-Patent Document 1]: https://help.twitch.tv/s/article/how-to-use-clips?language=en_US

SUMMARY OF THE DISCLOSURE

An embodiment of subject application relates to a server comprising a circuitry, wherein the circuitry is configured to perform: generating an emulator in response to a request from a first user terminal of a first user; launching an application via the emulator; receiving streaming data and interaction data via the application; rendering the streaming data with the interaction data; recording the rendered streaming data and interaction data as a clip; and storing the clip for access from the first user terminal of the first user.

Another embodiment of subject application relates to a method, comprising: generating an emulator in response to a request from a first user terminal of a first user; launching an application via the emulator; receiving streaming data and interaction data via the application; rendering the streaming data with the interaction data; recording the rendered streaming data and interaction data as a clip; and storing the clip for access from the first user terminal of the first user.

Another embodiment of subject application relates to a computer program for causing a server to realize the functions of: generating an emulator in response to a request from a first user terminal of a first user; launching an application via the emulator; receiving streaming data and interaction data via the application; rendering the streaming data with the interaction data; recording the rendered streaming data and interaction data as a clip; and storing the clip for access from the first user terminal of the first user.

According to the present disclosure, the clips may be generated in a more efficient and accurate manner, and a more immersive experience on watching the clips may be provided. Moreover, the review and share of clips may be more flexible. Therefore, the user experience may be improved.

BRIEF DESCRIPTION OF THE DRAWINGS

FIG. 4 shows an exemplary data structure of the stream DB 320 of FIG. 3.

FIG. 5 shows an exemplary data structure of the user DB 322 of FIG. 3.

FIG. 6 shows an exemplary data structure of the archive DB 324 of FIG. 3.

FIG. 7 shows an exemplary data structure of the context DB 326 of FIG. 3.

FIG. 8 shows an exemplary data structure of the clip DB 328 of FIG. 3.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

The live streaming system 1 according to some embodiments of subject application provides enhancement among the users to communicate and interact smoothly. More specifically, it entertains the viewers and livestreamers in a technical way.

Figure 1:
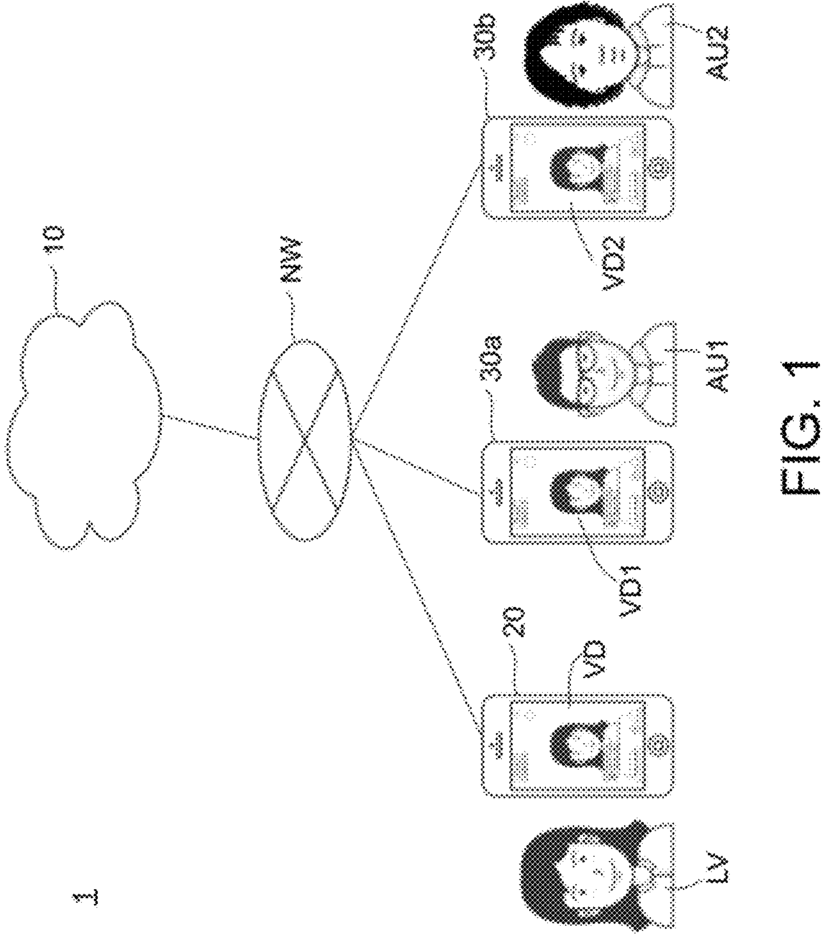
FIG. 1 is a schematic configuration of a live streaming system 1 according to some embodiments of subject application.

FIG. 1 shows a schematic configuration of a live streaming system 1 according to some embodiments of subject application. The live streaming system 1 provides a live streaming service for the streaming livestreamer (may also be referred as liver, streamer or distributor) LV and viewer (may also be referred as audience) AU (AU1, AU2 . . . ) to interact mutually in real time. As shown in FIG. 1, the live streaming system 1 may include a server 10, a user terminal 20 and a user terminal 30 (30*a*, 30*b* . . . ). The user terminal 20 may be a livestreamer and the user terminal 30 may be a viewer. In some embodiments, the livestreamers and viewers may be referred to as the user. The server 10 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 10, user terminal 20 and user terminal 30 may be communicably connected by any type of wire or wireless network NW.

The live streaming system 1 is involved in the livestreamer LV, the viewer AU, and APP provider (not shown), who provides the server 10. The livestreamer LV may record his/her own contents such as songs, talks, performance, game streaming or the like by his/her own user terminal 20 and upload to the server 10 and be the one who distributes contents in real time. In some embodiments, the livestreamer LV may interact with the viewer AU via the live streaming.

The APP provider may provide a platform for the contents to go on live streaming in the server 10. In some embodiments, the APP provider may be the media or manager to manage the real time communication between the livestreamer LV and viewer AU. The viewer AU may access the platform by the user terminal 30 to select and watch the contents he/she would like to watch. The viewer AU may perform operations to interact with the livestreamer, such as commenting or cheering the livestreamer, by the user terminal 30. The livestreamer, who provides the contents, may respond to the comment or cheer. The response of the livestreamer may be transmitted to the viewer AU by video and/or audio or the like. Therefore, mutual communication among the livestreamer and viewer may be accomplished.

The "live streaming" in this specification may be referred to as the data transmission which enables the contents the livestreamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format, Web Real-Time Communications, Real-Time Messaging Protocol, MPEG DASH or the like. The live streaming may further include the embodiment that the viewer AU may reproduce or watch the contents with specific delay while the livestreamer is recording the contents. Regarding the magnitude of the delay, it should be at least small enough to enable the livestreamer LV and the viewer AU to communicate. However, live streaming is different from so-called on-demand streaming. More specifically, the on-demand streaming may be referred to as storing all data, which records the contents, in the server and then providing the data from the server to the user at random timing according to the user's request.

The "streaming data" in this specification may be referred to as the data includes image data or voice data. More specifically, the image data (may be referred to as video data) may be generated by the image pickup feature of the user terminal 20 and 30. The voice data (may be referred to as audio data) may be generated by the audio input feature of the user terminal 20 and 30. The streaming data may be reproduced by the user terminal 20 30, so that the contents relating to users may be available for watching. In some embodiments, during the period from the streaming data being generated by the user terminal 20 of the livestreamer to being reproduced by the user terminal 30 of the viewer, the processing of changing format, size or specification of the data, such as compression, extension, encoding, decoding, transcoding or the like, is predictable. Before and after this kind of processing, the contents (such as video and audio) are substantially unchanged, so it is described in the current embodiments of the present disclosure that the streaming data before being processed is the same as that after being processed. In other words, if the streaming data is generated by the user terminal 20 of the livestreamer and reproduced by the user terminal 30 of the viewer via the server 10, the streaming data generated by the user terminal 20 of the livestreamer, the streaming data passed through the server 10 and the streaming data received and reproduced by the by the user terminal 30 of the viewer are all the same streaming data.

As shown in FIG. 1, the livestreamer LV is providing the live streaming. The user terminal 20 of the livestreamer generates the streaming data by recording his/her video and/or audio, and transmits to the server 10 via the network NW. At the same time, the user terminal 20 may display the video VD on the display of the user terminal 20 to check the streaming contents of the livestreamer LV.

The viewer AU1, AU2 of the user terminal 30*a*, 30*b*, who request the platform to provide the live streaming of the livestreamer, may receive streaming data corresponding to the live streaming via the network NW and reproduce the received streaming data to display the video VD1, VD2 on the display and output the audio from a speaker or the like. The video VD1, VD2 displayed on the user terminal 30*a*, 30*b* respectively may be substantially the same as the video VD recorded by the user terminal 20 of the livestreamer LV, and the audio outputted from the terminal 30*a*, 30*b* may also be substantially the same as the audio recorded by the user terminal 20 of the livestreamer LV.

The recording at the user terminal 20 of the livestreamer may be simultaneous with the reproducing of the streaming data at the user terminal 30*a*, 30*b* of the viewer AU1, AU2. If a viewer AU1 inputs a comment on the contents of the livestreamer LV into the user terminal 30*a*, the server 10 will display the comment on the user terminal 20 of the livestreamer in real time, and also display on the user terminal 30*a*, 30*b* of the viewer AU1, AU2 respectively. If the livestreamer LV responds to the comment, the response may be outputted as the text, image, video or audio from the terminal 30*a*, 30*b* of the viewer AU1, AU2, so that the communication of the livestreamer LV and viewer LV may be realized. Therefore, the live streaming system 1 may realize the live streaming of two-way communication.

Figure 2:
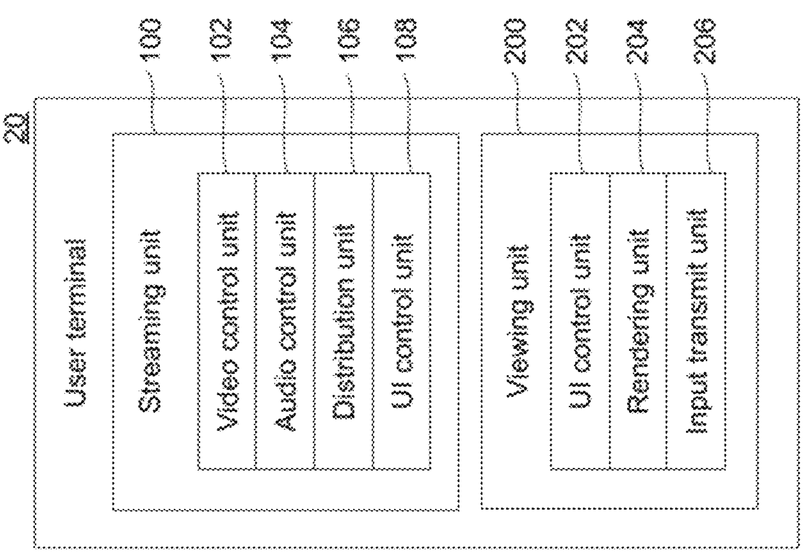
FIG. 2 is a schematic block diagram of the user terminal 20 according to some embodiments of subject application.

FIG. 2 is a block diagram showing a function and configuration of the user terminal 20 in FIG. 1 according to the embodiment of the present disclosure. The user terminal 30 has the similar function and configuration of the user terminal 20. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

The livestreamer LV and viewer AU may download and install the live streaming application (live streaming APP) of the present disclosure to the user terminal 20 and 30 from the download site via network NW. Or the live streaming APP may be pre-installed in the user terminal 20 and 30. By the execution of the live streaming by the user terminal 20 and 30, the user terminals 20 and 30 may communicate with the server 10 via the network NW to realize a plurality of functions. The functions realized by the execution of the live streaming APP by the user terminal 20 and 30 (More specifically, the processor such as CPU) is described below as the functions of the user terminal 20 and 30. These functions are basically the functions that the live streaming APP makes the user terminals 20 and 30 realize. In some embodiments, these functions may also be realized by transmitting from the server 10 to the web browser of the user terminal 20 and 30 via network NW and be executed by the computer program of the web browser. The computer program may be written in the programming language such as HTML (Hyper Text Markup Language) or the like.

The user terminal 20 includes streaming unit 100 and viewing unit 200. In some embodiments, the streaming unit 100 is configured to record the audio and/or video data of the user and generate streaming data to transmit to the server 10. The viewing unit 200 is configured to receive and reproduce streaming data from the server 10. In some embodiments, a user may activate the streaming unit 100 when broadcasting or activate the viewing unit 200 when watching streaming respectively. In some embodiments, the user terminal 20 who is activating the streaming unit 100 may be referred to as a livestreamer or be referred to as the user terminal 20 which generates the streaming data. The user terminal 30 who is activating the viewing unit 200 may be referred to as a viewer or be referred to as the user terminal 30 which reproduces the streaming data.

The streaming unit 100 may include video control unit 102, audio control unit 104, distribution unit 106 and UI control unit 108. The video control unit 102 may be connected to a camera (not shown) and the video is controlled by the camera. The video control unit 102 may obtain the video data from the camera. The audio control unit 104 may be connected to a microphone (not shown) and the audio is controlled by the microphone. The audio control unit 104 may obtain the audio data from the microphone.

The distribution unit 106 receives streaming data, which includes video data from the video control unit 102 and audio data from the audio control unit 104, and transmits to the server 10 via network NW. In some embodiments, the distribution unit 106 transmits the streaming data in real-time. In other words, the generation of the streaming data from the video control unit 102 and audio control unit 104, and the distribution of the distribution unit 106 is performed simultaneously.

UI control unit 108 controls the UI for the livestreamer. The UI control unit 108 is connected to a display (not shown) and is configured to generate the streaming data to whom the distribution unit 106 transmits, reproduces and displays the streaming data on the display. The UI control unit 108 shows the object for operating or the object for instruction-receiving on the display and is configured to receive the tap input from the livestreamer.

The viewing unit 200 may include UI control unit 202, rendering unit 204 and input transmit unit 206. The viewing unit 200 is configured to receive streaming data from the server 10 via network NW. The UI control unit 202 controls the UI for the viewer. The UI control unit 202 is connected to a display (not shown) and/or speaker (not shown) and is configured to display the video on the display and output the audio from the speaker by reproducing the streaming data. In some embodiments, Outputting the video on the display and audio from the speaker may be referred to as "reproducing the streaming data". The UI control unit 202 may be connected to an input unit such as touch panel, keyboard or display or the like to obtain input from the users.

The rendering unit 204 may be configured to render the streaming data from the server 10 and the frame image. The frame image may include user interface objects for receiving input from the user, the comments inputted by the viewers and the data received from the server 10. The input transmit unit 206 is configured to receive the user input from the UI control unit 202 and transmit to the server 10 via the network NW.

In some embodiments, the user input may be clicking an object on the screen of the user terminal 20 such as selecting a live stream, entering a comment, sending a gift, following or unfollowing a user, voting in an event, gaming or the like. For example, the input transmit unit 206 may generate gift information and transmit to server 10 via the internet NW if the user terminal 30 of the viewer clicks a gift object on the screen in order to send a gift to the livestreamer.

Figure 3:
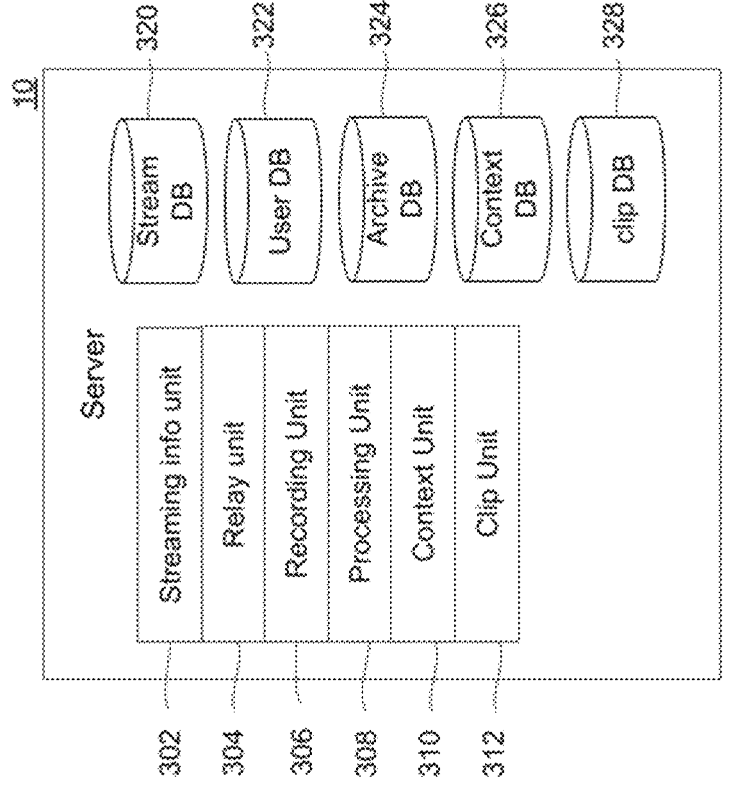
FIG. 3 is a schematic block diagram of the server 10 according to some embodiments of subject application.

FIG. 3 is a schematic block diagram of the server 10 according to some embodiments of the subject application. The server 10 may include streaming info unit 302, relay unit 304, recording unit 306, processing unit 308, context unit 310, stream DB 320, user DB 322, archive DB 324, context DB 326 and clip DB 328.

The streaming info unit 302 receives the request of live streaming from the user terminal 20 of the livestreamer via the network NW. Once receiving the request, the streaming info unit 302 registers the information of the live streaming on the stream DB 320, In some embodiments, the information of the live streaming may be the stream ID of the live streaming and/or the livestreamer ID of the livestreamer corresponding to the live streaming.

Once receiving the request of providing the information of the live streaming from the viewing unit 200 of the user terminal 30 from the viewer via the network NW, the streaming info unit 302 refers to the stream DB 320 and generates a list of the available live streaming.

The streaming info unit 302 then transmits the list to the user terminal 30 via the network NW. The UI control unit 202 of the user terminal 30 generates a live streaming selection screen according to the list and displays the list on the display of the user terminal 30.

Once the input transmit unit 206 of the user terminal 30 receives the selection of the live streaming from the viewer on the live streaming selection screen, it generates the streaming request including the stream ID of the selected live streaming and transmits to the server 10 via the network. The streaming info unit 302 may start to provide the live streaming, which is specified by the stream ID in the streaming request, to the user terminal 30. The streaming info unit 302 may update the stream DB 320 to add the viewer's viewer ID of the user terminal 30 to the livestreamer ID of the stream ID.

The relay unit 304 may relay the transmission of the live streaming from the user terminal 20 of the livestreamer to the user terminal 30 of the viewer in the live streaming started by the streaming info unit 302. The relay unit 304 may receive the signal, which indicates the user input from the viewer, from the input transmit unit 206 while the streaming data is reproducing. The signal indicating the user input may be the object-designated signal which indicates the designation of the object shown on the display of the user terminal 30. The object-designated signal may include the viewer ID of the viewer, the livestreamer ID of the livestreamer, who delivers the live streaming the viewer is viewing, and object ID specified by the object. If the object is a gift or the like, the object ID may be the gift ID or the like. Similarly, the relay unit 304 may receive the signal indicating the user input of the livestreamer, for example the object-designated signal, from the streaming unit 100 of the user terminal 20 while the streaming data is reproducing.

The recording unit 306 may be configured to record the live streaming. In some embodiments, the recording unit 306 may record the live streaming automatically or manually according to the setting by the user terminal 20 of the livestreamer. For example, the livestreamer may turn on an auto-archive function before starting live streaming in order to record and archive the live streaming automatically. The recording unit 306 may start recording the live streaming when the livestreamer starts streaming and stop recording once the live streaming is ended. In some embodiments, the livestreamer or the viewer may also clip the live streaming manually during the live streaming.

In some embodiments, the recording unit 306 may record the live streaming with a maximum duration of the archive contents, such as eight hours or the like. For example, the recording unit 306 may record the live streaming with a duration up to eight hours or the like. If the live streaming continues for less than eight hours, the recording unit 306 may record and archive the live streaming. However, if the live streaming is longer than eight hours, the recording unit 306 may record the live streaming for eight hours and start another recording for the next eight hours or less.

In some embodiments, the archive contents of the live streaming may be stored in storage such as Google Cloud and register the data of the archive contents in the archive DB 324 for reference and further processing. In some embodiments, any possible transmission protocol such as HTTP live streaming (HLS) may be applied among the server and user terminals. In some embodiments, the recording unit 306 may receive live streaming from a streaming source and record the live streaming as archive contents.

During a live streaming communication, different transmission protocols may be used. Here, HTTP live streaming (HLS) is taken as an example for explanation. HTTP live streaming (HLS) is an HTTP-based streaming media network transmission protocol which is proposed by Apple Inc. The HLS is formed by M3U8 segment index files and transport stream (TS) segments.

The M3U8 file may be referred to as an index file of a ts segment, and may be used for storing download addresses of ts segments in a server. A user terminal can read the ts segments in turn according to the M3U8 file. A ts segment may be referred to as a video clip obtained by dividing an entire video file or a video stream. Each ts segment may include a plurality of frames of video. A ts segment may be around 1~2 seconds or the like. Each ts segment may include one or more GOP (group of picture) structures, which include a plurality of frames of video. A GOP may contain different frame types such as I frame, P frame, B frame or the like. SEI message may be inserted and saved in the I frame.

The HLS may divide an entire audio and video stream into small HTTP-based files for downloading, and only a portion of the files may be downloaded each time. When a media stream is playing, viewers may select to download the same resource at different rates from many different alternate sources, and allow a streaming media session to adapt to different data rates.

Different streaming sources may provide different formats of the streaming data such as FLV or M3U8. The recording unit 306 may receive streaming data from the streaming sources and convert the format of the streaming data into any kind of format for processing. The recording unit 306 may record and store the archive contents as any possible format of streaming data. Here, the M3U8 playlist with the ts segments is taken as an example for explanation. The recording unit 306 may record the streaming data for the live streaming as the ts segments for the processing unit 308 to check and store in a storage.

The processing unit 308 may be configured to process the archive contents. In some embodiments, the processing unit 308 may check and store the archive contents as transport stream (TS) segments. The processing unit 308 may further generate a M3U8 playback list for the TS segments. In some embodiments, the processing unit 308 may keep the archive contents in the storage and database for a specific period such as 7 days, 14 days or the like. Therefore, the memory may be used efficiently.

The context unit 310 may be configured to handle context of interaction information. Here, the context may refer to a rendering context. The context may include interaction information from the viewers. For example, the viewer may send a message or send a gift to the livestreamer and the context may include the information of the message, gift message, animation, gift animation or the like. The context unit 310 may receive interaction information from the viewers and store the interaction information in the context DB 326. In some embodiments, the context unit 310 may include a plurality of working units for handling contexts from different users.

In some embodiments, the context unit 310 may receive the interaction information from the viewers via a backend server. In some embodiments, the context unit 310 may receive the interaction information from the livestreamer terminal via a backend server. For example, the livestreamer may send a message to the viewers or the like. In some embodiments, the context unit 310 may receive the interaction information from the backend server directly. For example, the backend server may send a message to inform that a VIP user is online and join the live streaming, and the context may include the interaction information of the VIP online notification. In some embodiments, the backend server may transmit the interaction information including identifiers such as UTC time information. In some embodiments, the context unit 310 may receive any kind of interaction information such as text, image, animation, notification or the like during the live streaming.

The clip unit 312 may be configured to process the clip contents. In some embodiments, the clip unit 312 may retrieve streaming data and interaction data, and transmit to the ECM for rendering and recording. Here, the interaction data may be any possible interactive information in the live streaming room such as message, comment, gift, following, gaming, VIP online notification, entrance animation or the like.

In some embodiments, the streaming data and interaction data may be archive data and context data from the archive DB 324 and context DB 326. In some embodiments, the streaming data and interaction data may be live streaming data or live interaction data from, for example, the streaming server and Backend server or the like. In other words, the streaming data and interaction data may be the archive data and context data from the archive DB 324 and context DB 326, or from a live streaming in real time.

In some embodiments, the clip unit 312 may store the clip contents in a storage and a database. In some embodiments, the clip unit 312 may also generate a link to the clip contents. In some embodiments, the clip contents may be kept forever or be deleted after a specific period such as 7 days, 14 days or the like. In some embodiments, the setting of the clip contents may be determined flexibly according to the practical need.

FIG. 4 shows an exemplary data structure of the stream DB 320 of FIG. 3. The stream DB 320 holds information regarding a live streaming currently taking place. The stream DB 320 stores a stream ID for identifying a live streaming on a live distribution platform provided by the live streaming system 1, a livestreamer ID for identifying the livestreamer who provides the live streaming, and a viewer ID for identifying a viewer of the live streaming, in association with each other.

FIG. 5 shows an exemplary data structure of the user DB 322 of FIG. 3. The user DB 322 holds information regarding users. The user DB 322 stores a user ID for identifying a user, points for identifying the points the user accumulates, level for identifying the level of the user and status for identifying the status of the user, in association with each other. The point is the electronic value circulated within the live streaming platform. The level may be an indicator of the amount of user activity or engagement on the live streaming platform. The status may be an identity or membership status of the user on the live streaming platform.

FIG. 6 shows an exemplary data structure of the archive DB 322 of FIG. 3. The archive DB 324 holds information regarding archive contents. The archive DB 324 stores an archive ID for identifying the archive contents, a timestamp for identifying the time information of the archive contents, a duration for identifying the duration of the archive contents, and an archive URL for identifying the location of the archive contents, in association with each other.

FIG. 7 shows an exemplary data structure of the context DB 326 of FIG. 3. The context DB 326 holds information regarding context data. The context DB 326 stores a context ID for identifying the context data, a type for identifying the type of the context data, and a timestamp for identifying the time information of the context in association with each other. In some embodiments, any kind of interaction information from livestreamer terminal, viewer terminal or backend server may be queried from the context unit 310 such as messaging, commenting, gifting, following, gaming, VIP online notification or the like.

FIG. 8 shows an exemplary data structure of the clip DB 328 of FIG. 3. The clip DB 328 holds information regarding clip contents. The clip DB 328 stores a clip ID for identifying the clip contents, a duration for identifying the duration of the clip contents, and a clip URL for identifying the location of the clip contents, in association with each other. In some embodiments, the clip DB 328 may further include information about archive data and context data, for example, the archive ID, context ID or the like.

Figure 9:
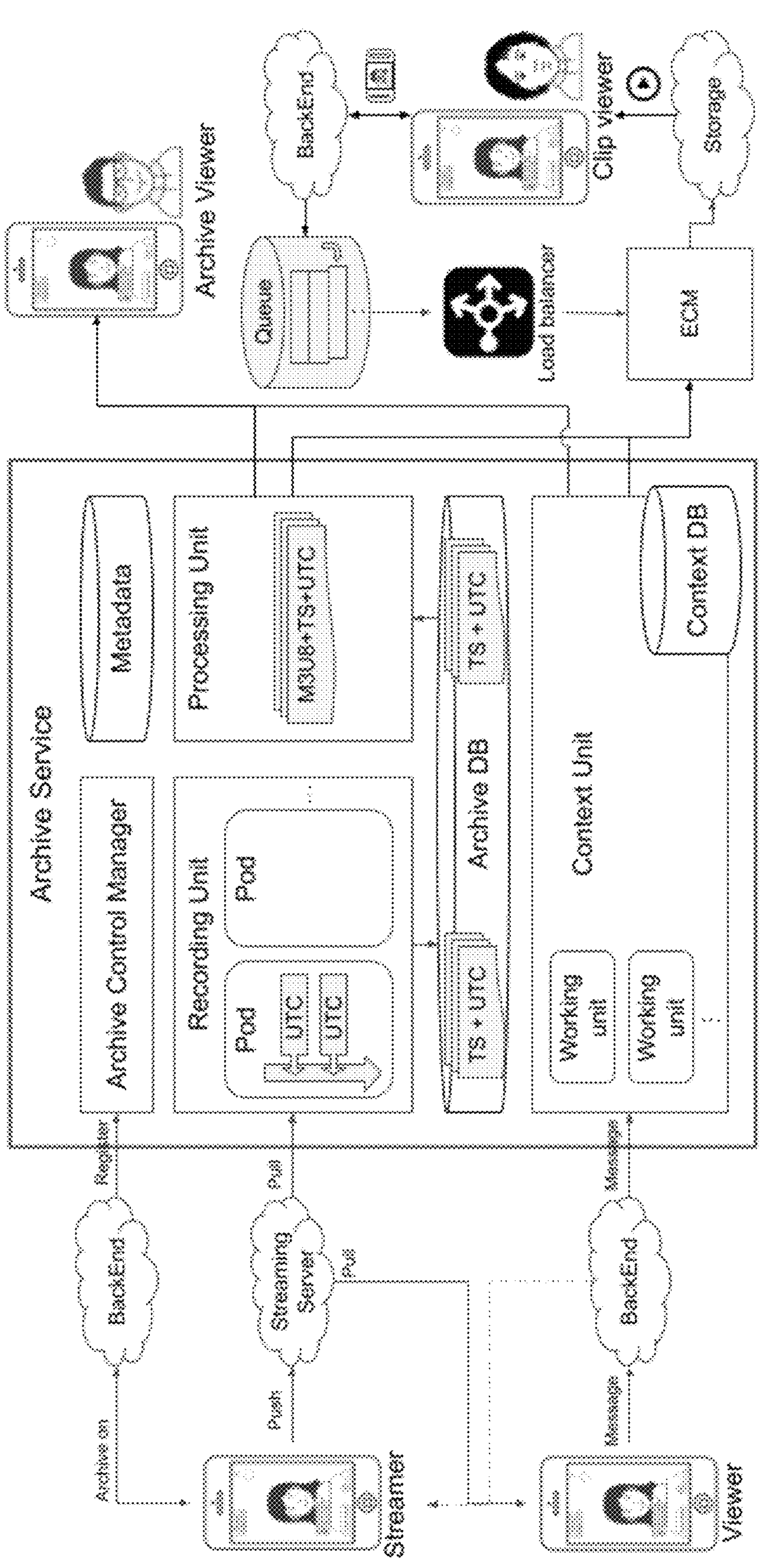
FIG. 9 and FIG. 10 are exemplary functional configurations of the live streaming system 1 according to some embodiments of subject application.

FIG. 9 is an exemplary functional configuration of the live streaming system 1 according to some embodiments of subject application. As shown in FIG. 9, the livestreamer may turn on the archive function in the APP. In some embodiments, the livestreamer may toggle on the icon of archive function to indicate that the livestreamer would like to archive the live streaming. The backend may inform the archive control manager to register an archive task for the livestreamer. In some embodiments, the backend may further inform the livestreamer that the setup of the archive function was successful by messaging or the like.

The livestreamer may further start a live streaming by pushing the streaming data to the streaming server. In some embodiments, the livestreamer may start the live streaming by portable terminal such as smartphone or the like. In some embodiments, the livestreamer may start the live streaming by software on a computer such as OBS (Open Broadcaster Software). The archive service may be applied to any kind of streaming method from the livestreamer. The recording unit 306 may pull the live streaming for recording. In some embodiments, the recording unit 306 may insert an identifier in the frame of the archive video while recording the live streaming. For example, the identifier may be inserted in the SEI (Supplemental Enhancement Information) of the frame of the archive video respectively. Therefore, the frame of the archive video may include identifier information.

In some embodiments, the duration of the ts segment may be one second and the ts segment may include one GOP structure. One GOP structure may include one I-frame and some P-frame. The I-frame may be the main frame, and the P-frame may be the supplementary frame. For example, the I-frame may include the main frame information of the original frame of live streaming, and the P-frame may include some supplementary information such as the difference between the current I-frame and previous I-frame or the like. According to the embodiments, the transmission volume may be reduced.

In some embodiments, one ts segment may include one GOP with one I-frame, which may be used to insert the SEI message with the identifier. In other words, one ts segment may include one identifier such as UTC time information. In some embodiments, one ts segment may include more GOP with more I-frame due to the recording or connection, so one ts segment may include more than one UTC time information or the like.

The SEI may be referred to as the text data inserted into the audio and video bitstream to convey extra information. SEI is a standard NAL (Network Abstraction Layer) in the H.264 Video Coding, and it may contain various types of data that describe various properties of the video. SEI messages may also contain arbitrary user-defined data. Moreover, the SEI messages may indicate how the video is recommended to be post-processed or displayed without affecting the core decoding process.

In some embodiments, the identifier may be included in the SEI messages. In some embodiments, the identifier may include an UUID (Universal Unique Identifier) specifically for the archive video. The identifier may be saved in the frame of the archive video. In some embodiments, the identifier may be a unique series of number, letter, text, symbol, combination of above or the like. In some embodiments, the identifier may identify the frame of video or the ts segment of the video from each other. In other words, the identifier for the frame of the video or each ts segment of the video may be unique and different from the others.

In some embodiments, the identifier may be the time information of the frame of the archive video. In some embodiments, the time information may be relative time. For example, the time information may indicate the time length of the frame with respect to the beginning of the archive video, or the time length of the frame with respect to the previous frame of the archive video or the like.

In some embodiments, the time information may also be the absolute time information of the live streaming. For example, the recording unit 306 may save the absolute time of each frame while recording the live streaming as archive video. In some embodiments, the absolute time may be the standard time such as Greenwich Mean Time (GMT), Coordinated Universal Time, the Universal Time Coordinated (UTC) or the like. For example, if a livestreamer starts a live streaming from 2022-08-05T06:00:00Z to 2022-08-05T07:00:00Z, the recording unit 306 may write the UTC timestamp in the SEI messages for the frame of the archive video and save the SEI messages in corresponding frame of the archive video.

In some embodiments, the identifier may also be a tag which is tagged by the recording unit 306 during recording. For example, the recording unit 306 may also add a tag in a frame of the archive video. The backend server may further send a context with corresponding tag to the context unit 310. Therefore, the context unit 310 may transmit the context with the corresponding tag to the archive viewer when the archive viewers query the context with the tag. In some embodiments, the identifier may also be a unique code to identify the frames of archive contents from each other and connect the frames with corresponding contexts respectively. In some embodiments, the code may be generated by the server 10 or another third-party server or the like.

In some embodiments, AI tagging technology may also be applied for inserting tags in each frame of the archive video. Here, the AI tagging may be referred to as the process in which artificial intelligence is used to tag media files with metadata. For example, the recording unit 306 may add a tag automatically with a specific function and the backend server may generate a context with corresponding tag. The AI tagging may detect audio, video, text, image, animation or the like from the livestreamer or the viewer and generate a tag to be inserted into the corresponding frame of the archive video. For example, the livestreamer may talk about a car and an AI tag may be inserted during the conversation. The backend server may further generate information such as "car conversation is on-going" or car advertisement video or the like, insert corresponding tag and transmit to the context unit 310. Therefore, the archive video may understand more the topic the livestreamer was talking about. Moreover, if a viewer does not catch the point of livestreamer, the viewer may access the archive video with more information displayed on the screen.

In some embodiments, the AI tagging may also be applied according to the location or time information of the livestreamer or the viewer. For example, if the livestreamer was broadcasting in a cafe shop, the recording unit 306 may insert a tag to indicate the location of the cafe shop. The archive viewer may receive the information of the cafe shop while checking the archive contents. Moreover, the recording unit 306 may insert a tag periodically such as one hour or the like and generate a context of message with corresponding tag to indicate the time the archive viewer has watched or inform the archive viewer of taking a rest.

In some embodiments, the viewer may pull the live streaming from the streaming server for watching the live streaming. The viewer may interact with the livestreamer such as commenting, gifting or the like and the interaction information may be transmitted to the livestreamer or the other viewers via a backend server. In some embodiments, the backend server may further transmit the interaction information to the context unit 310. The context unit 310 may include one or more working units to handle the interaction information. For example, the working unit may write the interaction information into the context DB 326.

In some embodiments, when the backend server transmits the interaction information to the context unit 310, the interaction information may also include an identifier. More specifically, the identifier may be the time information for the backend server to receive the interaction information. In some embodiments, the time information may be relative or absolute such as GMT time, UTC time or the like. For example, the viewer may send a message to the livestreamer via the backend server and the backend server may save the time information as an identifier in the interaction information. In some embodiments, the context unit 310 may further receive the interaction information with the identifier and write into the context DB 326.

In some embodiments, one viewer user terminal 30 (may be referred to as archive viewer) may request archive contents from the archive service. The processing unit 308 may generate a M3U8 playback list for the ts segments. The M3U8 playback list may include the list of the ts segments and also the identifier information for each frame or ts segment. The identifier information may include, for example, the UTC information for each frame or ts segment respectively.

When the archive viewer replays the archive contents, the archive viewer user terminal 30 may parse the SEI message in the frame of the archive video to obtain the identifier information including the UTC information. In some embodiments, the archive viewer user terminal 30 may further query the context unit 310 about the corresponding context according to the UTC information. In some embodiments, the archive viewer user terminal 30 may query the contexts according to the time point the archive viewer would like to replay. For example, the archive viewer may replay the archive video from the beginning of the archive video or a specific time point of the archive video. The archive viewer user terminal 30 may parse the SEI message in the frame of the archive contents the archive viewer would like to replay and obtain the identifier information. For example, if the archive viewers replay the archive video from the beginning of the archive video and the UTC information is 2022-08-05T06:00:00Z, the archive viewer user terminal 30 may query the contexts with the timestamp of the UTC information.

In some embodiments, the rendering unit 204 may render the archive contents with the contexts of interaction information according to the identifier information. For example, the rendering unit 204 may render the frame of archive video with the contexts of interaction information according to the UTC information. Therefore, the archive viewer may watch the archive video with all interaction information included. In some embodiments, the interaction information may be the information in a live streaming room except for the video and audio streaming data. For example, the interaction information may be the message of a viewer clicking the like button, or the message that the livestreamer changed the title of the streaming room. The interaction information may also be the animation such as a viewer obtaining a title, or the animation of a dragon flying across the streaming room or the like.

According to the embodiments, the context unit 310 may receive and transmit any format of interaction information, and just transmit the interaction information to the viewer terminal according to the UTC information. Therefore, any format of interaction information may be displayed and synchronized in the archive contents, and the user experience may be improved.

In some embodiments, another viewer user terminal (may be referred to as clip viewer) may request a clip from the live streaming while watching the livestreamer in the live streaming room. For example, the viewer may clip the highlight moment in the live streaming room and share the highlight to other social media or the like. In some embodiments, the viewer may click a button such as the clip object 612 in FIG. 11 to send a request on clipping to the server 10. In some embodiments, the clips may also be automatically generated according to the parameters in the live streaming room such as the popularity of the live streaming, the number of viewers, comments or the like.

In some embodiments, the viewer may determine length, beginning time, ending time or the like of the clip. The viewer may also determine, for example, the resolution, thumbnail, video format or the like. Once the setting of the clip from the viewer is done, information of the request may be transmitted to the backend server. The backend server may generate a task queue for the request in a task queue system. In some embodiments, the task queue system may be an internal system or a third-party system such as Redis Queue System or the like. In such a system, tasks are placed into a queue and asynchronously processed by worker processes or servers.

In some embodiments, the queue of the request may further be transmitted to a load balancer server. The load balancer server may distribute requests from multiple sources to multiple instances or worker processes within the queue, which may help balance the workload, increase system availability, improve system scalability and traffic control. In some embodiments, the load balancer server may further distribute the queue of requests to the Emulator Control Manager (ECM) for recording the clip. In some embodiments, the load balancer may be an internal load balancer in the server 10 or a service provided by third-party service providers.

Figure 10:
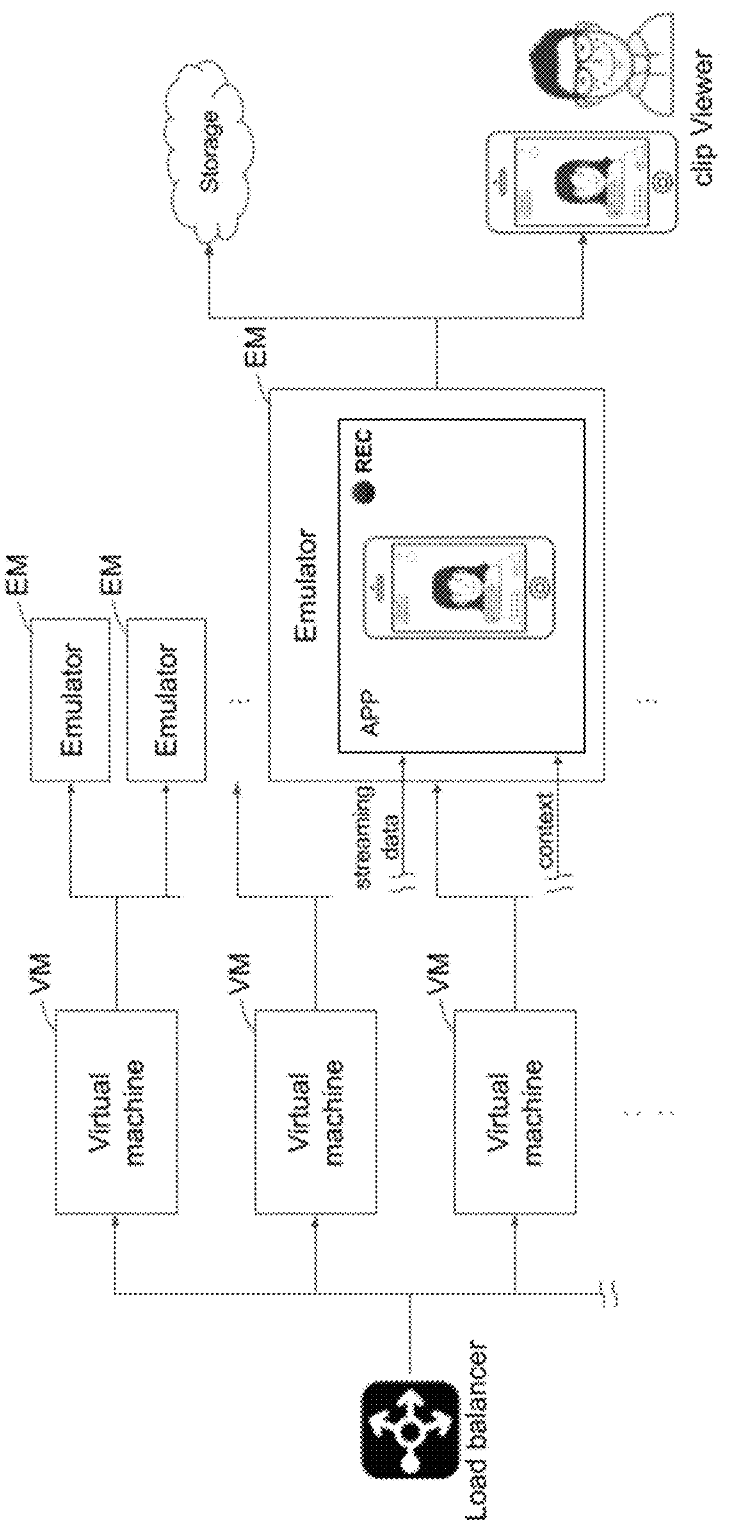

FIG. 10 is an exemplary functional configuration of the live streaming system 1 according to some embodiments of subject application. As shown in FIG. 10, the ECM may include one or more virtual machine VM. Purpose of the virtual machine (VM) is to simulate a separate computing environment. The function of virtual machines is to provide an abstraction layer to allow multiple independent virtual computing environments. This brings flexibility, manageability, and enhanced security to computing environments.

The load balancer server may distribute the queue of the request to one or more virtual machines. The virtual machines may generate one or more emulators EM in response to the request. The "emulator" may refer to a software or hardware tool that may simulate a hardware platform or device, and also enable it to be run in a different environment. In other words, the emulator may allow software designed for one system to be run on another by simulating the target hardware or software environment. In some embodiments, the emulator EM may be an Android Package in the Android operating system or other package in other platforms. In Android development, developers often use Android emulators to test and debug their applications, and these emulators may need to load and run application packages with the .apk file extension.

In some embodiments, one or more applications APP may be launched or simulated in the emulator EM. In other words, the application APP from the APP provider may be launched or simulated in the emulator EM. In some embodiments, the emulator EM may simulate a user terminal such as smart phone, computer or the like. After the launch or simulation of the application via the emulator EM is done, the emulator EM may receive the archive data and context data via the application. Furthermore, the emulator EM may also render the archive data with the context data from, for example, the archive DB 324 and context DB 326 via the application.

In some embodiments, the emulator EM may record the rendered archive data and context data as a clip. For example, information of the clip such as the length, beginning time and ending time may be used to determine the portion to be rendered or recorded. After the rendering and recording of the clip is done, the clip may further be stored in a storage. In some embodiments, the storage may be an internal space in the server 10 or a service provided by a third-party service provider such as Google Cloud Storage. In some embodiments, once the recording of a clip is done, an API may be transmitted to the queue system to remove the queue of the request from the task queue system.

In some embodiments, a link to the stored clip may also be generated and then transmitted to the clip viewer. The clip viewer may further watch the clip or share the clip to other social media sites or the like. In some embodiments, the link may be a website, URL, thumbnail or the like. The clip viewer may also watch the clip via the user terminal or re-edit the clip or the like.

For the archive viewer, the streaming data and interaction data is reconstructed when the client terminal requests archive contents. According to the embodiments, this may be advantageous in that any interaction data such as gift or comment (ex. a gift resulting from collaboration with external copyright holder where there is a specified term in which the live streaming service can use such gift on their platform) which expires or becomes obsolete at the time of replaying the archive may easily be removed from the archive contents. Other service implements the way in which whole view of the live streaming is recorded (like screenshot) when it is on-live and such recorded data is used for archive. This does not allow to remove any gift/comment from the archive later.

For the clip viewer, the above embodiments may be for preserving the above advantage regarding archive contents while generating clip contents as requested by a user. Therefore, an emulator is used to generate clip contents, but not for generating archive contents. More specifically, the archive contents may not be generated via the emulator. However, in some embodiments, the archive contents may also be generated via the emulator or the like. In some embodiments, the design of the archiving and clipping function may be determined flexibly.

FIG. 11-FIG. 14 are exemplary screen images of a live streaming room screen 600 shown on the display of the livestreamer user terminal 20 or the viewer user terminal 30. Once the viewer selects and enters a live streaming room, a live streaming room screen 600 of the livestreamer may be shown on the display. The live streaming room screen 600 may include a livestreamer info object 602, livestreamer image 604, message zone 606, message input box 608, gift object 610, clip object 612 or the like.

Figure 11:
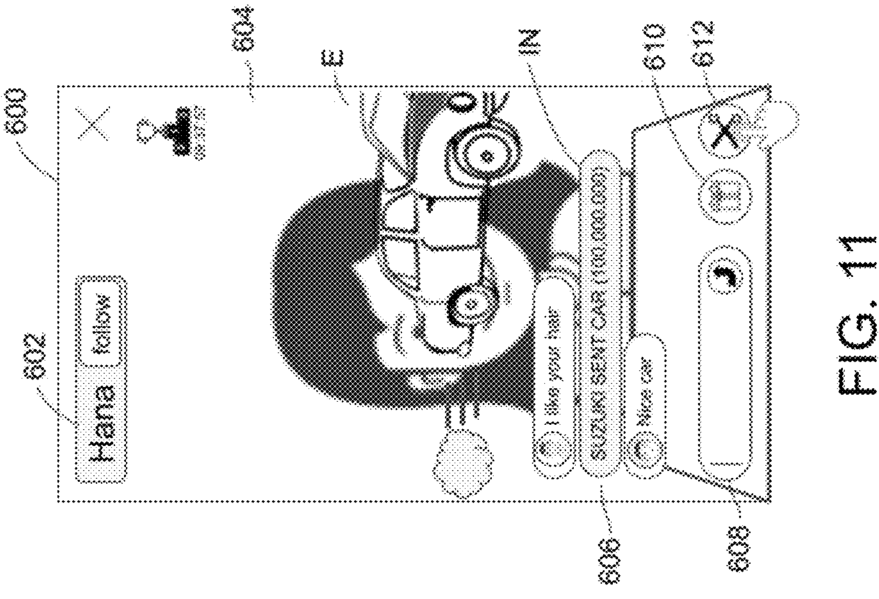

The viewer may interact with the livestreamer. For example, the viewer may tap the gift object 610 and a gift list (not shown) may be displayed on the screen 600. The gift list may include a plurality of gift objects, and the viewer may select a gift object to send to the livestreamer. As shown in FIG. 11, once the viewer clicks on a gift object, an effect E and information IN of the gift object may be displayed on the screen 600.

In some embodiments, the viewer may clip the live streaming by clicking the clip object 612. For example, the viewer may clip the portion of the live streaming while the effect E is displayed on the screen 600 and also capture the facial expression of the livestreamer when receiving the gift. According to the embodiments, the viewer may store or share the highlight in the live streaming for review afterward or promote the performance from the livestreamer.

Figure 12:
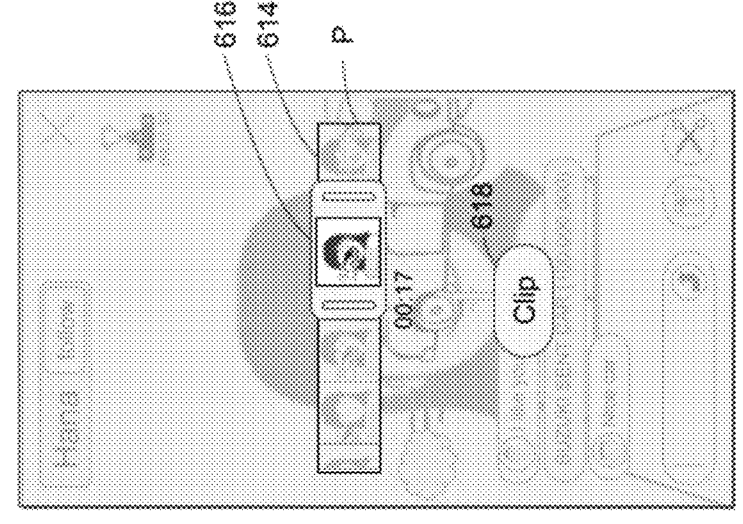
FIG. 11-FIG. 14 are exemplary screen images of a live streaming room screen 600 shown on the display of the livestreamer user terminal 20 or the viewer user terminal 30.

Once the clip object 612 is clicked, a clipping tool 614 may be displayed on the screen 600 as shown in FIG. 12. In some embodiments, the clipping tool 614 may include a portion of the live streaming including the streaming data, archive data and/or context data or the like. The portion P of the live streaming may be determined flexibly. For example, a 90 second of the live streaming from the time point the viewer clicks the clip object 612 to the previous or following 90 second of the live streaming may be provided in the portion P. The portion P may also be the previous 45 seconds and following 45 seconds from the time point the viewer clicks the clip object 612. In some embodiments, the duration of the portion P may be determined flexibly.

In some embodiments, an editing tool 616 may also be provided for the clip viewer to determine the information of the clip such as the length, duration, beginning time and ending time of the clip or the like. In some embodiments, the editing tool 616 may also include, for example, the duration time, title, the viewer information, the livestreamer information or the like. In some embodiments, the viewer may also adjust the, for example, resolution, quality, size or the like. In some embodiments, the function in the editing tool 616 may be determined flexibly according to the practical need.

In some embodiments, if information of the clip is determined, the viewer may further click a clip generation button 618 to generate the clip. Once the clip generation button 618 is clicked, a request on the clip may be transmitted to the server 10 to generate the clip. The generation of clip may be realized according to the procedure in FIG. 9 and FIG. 10.

Figure 13:
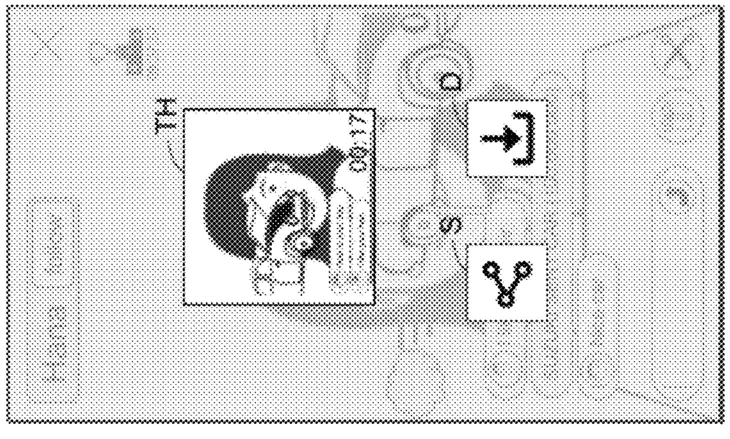

Once the generation of clip is done, the information of the clip may be displayed on the screen 600 for the clip viewer to check or the like. For example, a thumbnail TH of the clip may be displayed, and a share button S or download button D may also be displayed on the screen 600 as shown in FIG. 13 for the viewer to share, download or the like. In some embodiments, a link such as an URL or the like may also be provided. In some embodiments, the layout and UI of the clipping function may be determined flexibly.

Figure 14:
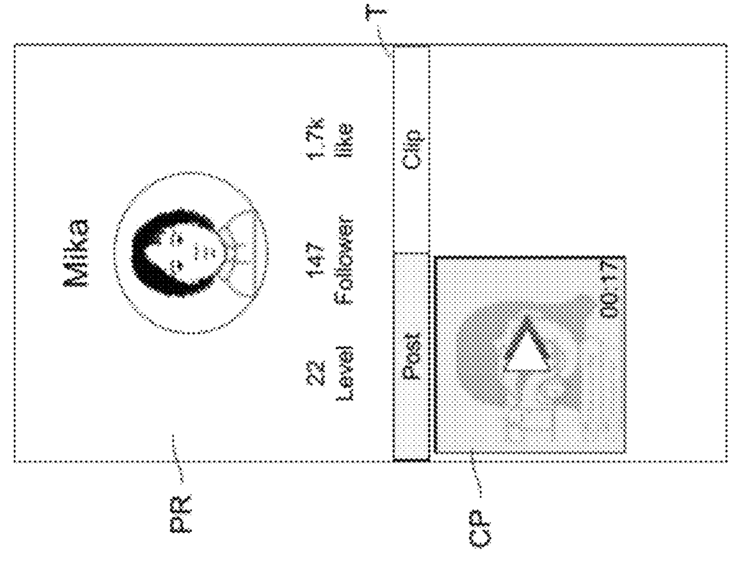

In some embodiments, the clip CP of the live streaming may also be stored in a profile page PR of the user as shown in FIG. 14. In some embodiments, the profile page PR may include a tab T for the user to click in order to get access to the clip CP from the user. The user may get access to the clip CP by clicking the tab T in the profile page PR or the like. In some embodiments, the layout and UI may be determined flexibly according to the practical need.

Figure 15:
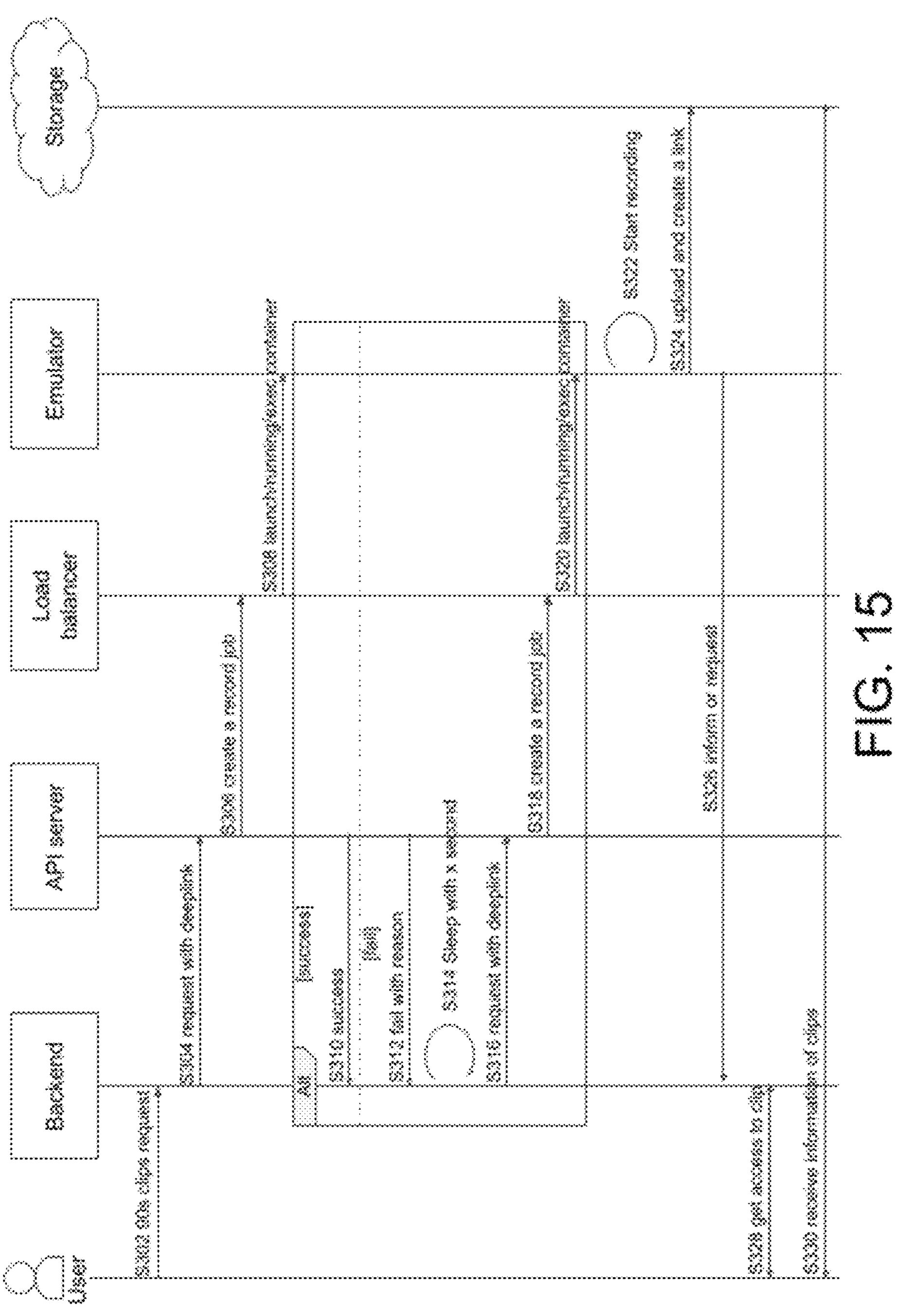
FIG. 15 is an exemplary sequence chart illustrating an operation of the configuration of the live streaming system 1 according to some embodiments of subject application.

FIG. 15 is an exemplary sequence chart illustrating an operation of the configuration of the live streaming system 1 according to some embodiments of subject application. In some embodiments, the viewer may perform an operation such as clicking a clip object 612 to clip a portion of the live streaming. As shown in FIG. 15, once the clip object 612 is clicked by the viewer, a request of clipping may be transmitted to the backend server (S302).

In some embodiments, the backend may further transmit the request with a deep link to the API server (S304). More specifically, the backend may send a request to the API server, and this request includes a deep link. This type of request may contain specific paths, parameters, or identifiers indicating that the API server should perform certain actions, directing the user to specific content or features within a mobile application. In some embodiments, the deep link may be linked to the action of generating an emulator, launching an application or the like. In some embodiments, the API server may be an internal API server in the server 10 or a server provided by third-party service providers.

In some embodiments, the API server may further create a record job and then transmit the queue of the request to a load balancer server (S306). The load balancer server may further distribute the request to one or more emulators for generating clips (S308). In some embodiments, if step S306 and step S308 are successful (S310) and the ECM server is ready to start the recording, the API server may transmit a response of "success" to the Backend to indicate that the request is accepted, and then the recording procedure in the emulator EM may be started (S322).

In some embodiments, if step S306 and step S308 are not successful, the API server may transmit a response of "fail" with reason to the Backend (S312). In some embodiments, the reason for the response of "fail" may be requesting time-out, server overload or the like. Here, "requesting time-out" may refer to a timeout being requested during a network request or the like. A timeout occurs when a response or result is not received within a specified time frame. For example, if a response of "success" is not received in 300 seconds, a response of "fail" with reason of "requesting time-out" may be transmitted to the backend server. In some embodiments, if the ECM server is overloaded, the response of "fail" with reason of "server overload" may be transmitted to the backend server.

In some embodiments, the backend server may sleep for a specific amount of time (S314) and then transmit the request with a deep link to the API server again (S316). Here, sleeping for a specific amount of time may refer to waiting for a retry time and then sending the request to the API server again after the retry time. For example, the backend server may determine a retry time such as 5, 10, 30 seconds or the like. The backend server may further transmit a next request on the clip after the retry time. In some embodiments, the API server may further create a record job and then transmit the queue of the request to a load balancer server (S318). The load balancer server may further distribute the request to one or more emulators for generating clips (S320).

After the above procedure is done and a response of "success" is transmitted to the Backend, then the recording procedure in the emulator EM may be started (S322). The emulator may record the clip according to information of the request such as length, beginning time, ending time or the like. After the recording of the clip is done, the clip may further be stored in a storage such as the Google Cloud Storage, and a link to the clip may be created (S324). The emulator EM may further inform the Backend of the finish of recording and uploading, and also the link or the like. In some embodiment, the link may be an URL indicating location of the clip contents in the storage.

In some embodiments, the link may be determined by the Backend server while the Backend transmits the request to the API server in step S304. The clip contents may be uploaded to storage according to the link in the API request from the Backend. In other words, the API request from the Backend may include information of the link, so that the emulator EM may upload the clip contents to the link after the recording is finished. Therefore, once the recording and uploading of the clip contents is finished, the Backend may also receive the link information of the clip contents. In some embodiments, the clip may be stored as a .mp4 file in format or the like. In some embodiments, format of the clip contents may be determined flexibly.

In some embodiments, the backend server may be informed of the finish of the recording and uploading of the clip contents (S326). For example, the emulator EM may inform the backend of the completion of recording and uploading the clip. In some embodiments, the emulator EM may also transmit the link or the like to the backend server. In some embodiments, the backend server may also request information on the clip from the emulator EM or the like.

In some embodiments, the user may further get access to the clip contents (S328). For example, the user may check, download or share the clip contents. In some embodiments, information of the clip contents may also be displayed in the user's personal page for the user to get access to. For example, the user may open a clip tab in the profile page to check the clip contents or the like.

Once the user requests on getting access to the clip contents, the Backend server may access the user to the clip contents in the storage (S330). In some embodiments, the user may open the APP and then the information of the clip contents may be displayed in the user's profile page or the like. In some embodiments, the user may also click the download button or share button, so the user may be guided to the clip contents via the link so that the clip contents may be downloaded, forwarded or the like. According to the embodiments, the highlight in the live streaming may be clipped in a more efficient and smoother manner.

In some embodiments, the emulator EM may receive archive data and context data from the archive DB 324 and context DB 326 respectively, and then render the archive data and context data for recording. In some embodiments, the emulator EM may also receive streaming data and context data from the streaming server and backend server for recording. The rendering of the archive data and context data may be according to a timestamp of the data or the like.

In some embodiments, the clip viewer may watch the live streaming and clip a portion of the live streaming as highlight. In some embodiments, the clip viewer may also watch the archive video and clip a portion of the archive as highlight. In some embodiments, the livestreamer and the viewer may clip a portion of the live streaming as a highlight, the highlight may also be clipped automatically by parameters such as the popularity of the live streaming room, the number of comments, the comment of viewers or the like. In some embodiments, the highlight may also be clipped automatically via machine learning technology or the like.

In some embodiments, the server 10 may archive the live streaming automatically. The server 10 may also archive the live streaming in response to a request from the livestreamer or viewer. In some embodiments, a portion of the live streaming may be clipped as a highlight if the livestreamer turns on the auto-archive function. In some embodiments, even if the livestreamer does not turn on the auto-archive function, the server 10 may also clip a portion of the live streaming from the streaming data in the streaming server and context data in the backend server. In some embodiments, the setting of archive and clip may be determined flexibly.

Compared with rendering and recording via the user terminal, the quality of rendering and recording in the server 10 may provide better quality of the clip. more specifically, recording clips in the user terminal side may encounter unpredictable issues. For example, a LINE app message or update notification may suddenly pop out so the quality of the video may be lower. Moreover, rendering and recording in the server 10 may also provide a variety of parameters to be adjusted or the like. For example, the resolution or size of the clip may be determined by the viewer or the server 10, so that the clip may be suitable for various devices such as mobile phones, tablets, or computers.

In some embodiments, the retry time is either a fixed value or increases with the increase in retry count. Here, the "retry count" may refer to the number of times the backend server retries on transmitting the request with a deep link to the API server. In some embodiments, the retry time may be increased according to the retry count. In some embodiments, the relationship between the retry count and retry time may be determined flexibly according to the practical need.

According to the present disclosure, the clips may be generated in a more efficient and accurate manner, and a more immersive experience on watching the clips may be provided. Moreover, the review and share of clips may be more flexible. Therefore, the user experience may be improved.

Figure 16:
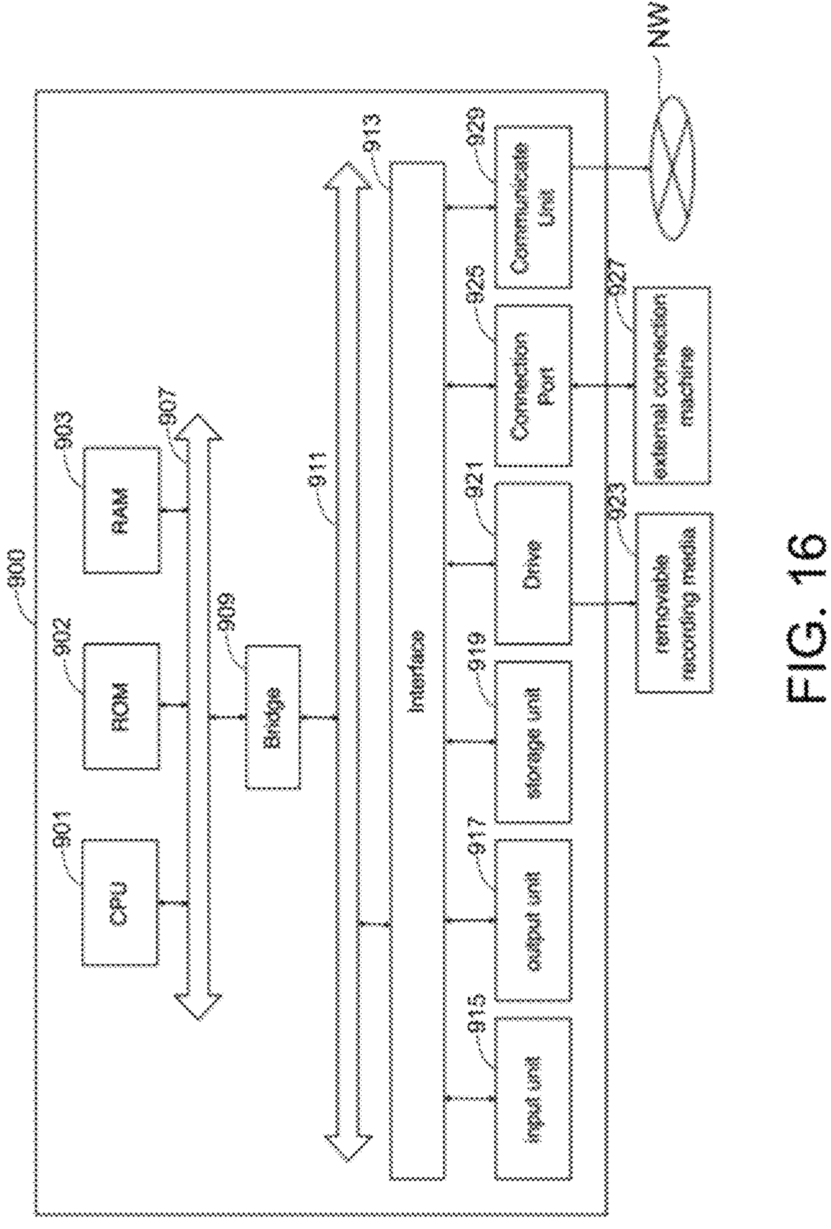
FIG. 16 is an exemplary hardware configuration of the information processing device according to some embodiments of subject application.

FIG. 16 is a schematic block diagram of computer hardware for carrying out a system configuration and processing according to some embodiments of subject application. The information processing device 900 in FIG. 16 is, for example, configured to realize the server 10 and the user terminal 20, 30 respectively according to some embodiments of subject application.

The information processing device 900 includes a CPU 901, read only memory (ROM) 902, and random-access memory (RAM) 903. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the streaming unit 100, the viewing unit 200, the video control unit 102, the audio control unit 104, the distribution unit 106, the UI control unit 108, the UI control unit 202, the rendering unit 204, the input transmit unit 206, the streaming info unit 302, the relay unit 304, the recording unit 306, the processing unit 308, the context unit 310, the stream DB 320, the user DB 322, the archive DB 324, the context DB 326, the clip DB 328 and so on, may be embodied as circuitry programmed to realize such functions.

The CPU 901 functions as an arithmetic processing device and a control device, and controls the overall operation or a part of the operation of the information processing device 900 according to various programs recorded in the ROM 902, the RAM 903, the storage unit 919, or a removable recording medium 923. For example, the CPU 901 controls overall operations of respective function units included in the server 10 and the user terminal 20 and 30 of the above-described embodiment. The ROM 902 stores programs, operation parameters, and the like used by the CPU 901. The RAM 903 transiently stores programs used when the CPU 901 is executed, and parameters that change as appropriate when executing such programs. The CPU 901, the ROM 902, and the RAM 903 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote-control device that uses, for example, infrared radiation and another type of radio waves. Alternatively, the input unit 915 may be an external connection device 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 903. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals on the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device and generates a captured image. The imaging device may capture a still picture or may capture a movie.

The present disclosure of the live streaming system 1 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the server 10 may be performed by other than the server 10, for example, being performed by the user terminal 20 or 30. In some embodiments, at least a part of the functions performed by the user terminal 20 or 30 may be performed by other than the user terminal 20 or 30, for example, being performed by the server 10. In some embodiments, the rendering of the frame image may be performed by the user terminal 30 of the viewer, the server, the user terminal 20 of the livestreamer or the like.

Furthermore, the system and method described in the above embodiments may be provided with a computer-readable non-transitory storage device such as a solid-state memory device, an optical disk storage device, or a magnetic disk storage device, or a computer program product or the like. Alternatively, the programs may be downloaded from a server via the Internet.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed but includes another variation and modification that do not disobey the present disclosure, and is the scope covered by the following patent application scope.

What is claimed is:

1. A method, comprising:

generating an emulator in response to a request from a first user terminal of a first user;

launching an application via the emulator;

receiving streaming data and interaction data via the application;

rendering the streaming data with the interaction data;

recording the rendered streaming data and the interaction data as a clip; and storing the clip for access from the first user terminal of the first user.

2. The method according to claim 1, further comprising:

transmitting the streaming data to a second user terminal of a second user; and transmitting the interaction data to the second user terminal of the second user; wherein the streaming data and the interaction data are from archive data and context data respectively and for rendering and displaying at the second user terminal.

3. The method according to claim 1, wherein:

the clip is generated via the emulator by taking the streaming data and the interaction data as inputs.

4. The method according to claim 1, wherein:

the streaming data and the interaction data are rendered according to time information inserted therein; and the time information includes relative time or absolute time such as GMT time, UTC time.

5. The method according to claim 1, wherein:

length, beginning time and ending time of the clip is determined by the first user terminal of the first user.

6. The method according to claim 1, wherein:

the interaction data includes information of message, comment, gift, following, gaming, VIP online notification or entrance animation.

7. The method according to claim 1, wherein:

the streaming data is from archive data or from live streaming data; and the interaction data is from context data or from live interaction data.

8. The method according to claim 1, further comprising:

determining a retry time in response to the generation of the emulator being failed; and transmitting a next request on the generation of the emulator after the retry time.

9. A server comprising a circuitry, wherein the circuitry is configured to perform:

generating an emulator in response to a request from a first user terminal of a first user;

launching an application via the emulator;

receiving streaming data and interaction data via the application;

rendering the streaming data with the interaction data;

recording the rendered streaming data and the interaction data as a clip; and storing the clip for access from the first user terminal of the first user.

10. A non-transitory computer-readable medium including program instructions, that when executed by one or more processors, cause the one or more processors to execute:

generating an emulator in response to a request from a first user terminal of a first user;

launching an application via the emulator;

receiving streaming data and interaction data via the application;

rendering the streaming data with the interaction data;

recording the rendered streaming data and the interaction data as a clip; and storing the clip for access from the first user terminal of the first user.

* * * * *